A. CASH.

BLOCK LEVELER.

APPLICATION FILED DEC. 3, 1919.

Reissued May 3, 1921.

15,098.

2 SHEETS—SHEET 1.

INVENTOR.

Albert Cash

By his Attorney

Nelson M. Howard

A. CASH.

BLOCK LEVELER.

APPLICATION FILED DEC. 3, 1919.

Reissued May 3, 1921.

15,098.

2 SHEETS—SHEET 2.

INVENTOR.

Albert Cash

By his Attorney

Nelson W. Howard

UNITED STATES PATENT OFFICE.

ALBERT CASH, OF AUBURN, MAINE, ASSIGNOR TO UNITED SHOE MACHINERY CORPORATION, OF PATERSON, NEW JERSEY, A CORPORATION OF NEW JERSEY.

BLOCK-LEVELER.

15,098. Specification of Reissued Letters Patent. Reissued May 3, 1921.

Original No. 1,249,026, dated December 4, 1917, Serial No. 122,100, filed September 25, 1916. Application for reissue filed December 3, 1919. Serial No. 342,238.

*To all whom it may concern:*

Be it known that I, ALBERT CASH, a citizen of the United States, residing at Auburn, in the county of Androscoggin and State of Maine, have invented new and useful Improvements in Block-Levelers, of which the following is a specification.

This invention relates to machines for cutting sheet material and particularly to machines for dieing out sheet material, such as fabrics and upper leather for boots and shoes.

It is an object of the invention to provide improved means for leveling or resurfacing the whole or any desired portion of the surface of the work supporting bed or block in machines of the class referred to in the foregoing statement.

In cutting beds or blocks, particularly those of clicking machines, it is important that the surface should be even and free from irregularities and depressions. At every cutting operation, however, the die is forced an appreciable distance into the surface of the block, so that certain portions, and more particularly the middle portions, soon show considerable wear. In many cases the peripheral portions of the block may be cut down to the level of the middle portions so that the dies will lie evenly on the surface and good cutting conditions prevail. In other cases it may be necessary to resurface the entire block.

To this end there is provided a resurfacing cutter driven directly from the armature shaft of an electric motor and so mounted that it may be moved with the greatest ease over any desired portion of the cutting bed or block. Preferably the supporting means for the cutter and its motor is provided with surfaces spaced from each other for sustaining the weight of the carrier or slide on which the cutter and motor are mounted, the supporting surfaces thus disposed serving to reduce friction to the minimum.

In some types of clicking machines, the presser arm and its support spring away from the work supporting bed or block during cutting operations, and more especially when the die being operated upon is at or adjacent to the free end of the presser arm. Consequently it will be found advantageous in resurfacing the block or bed to cut down the rear thereof to a slightly lower level than that of the front portion of the bed. With the surface of the block slanting slightly upwardly toward the front of the block, the die at the free end of the presser arm will be operated upon to cut through the work with the same certainty and regularity as that which accompanies dieing out operations on work located nearer the fixed end of the presser arm. An important feature of applicant's invention therefore consists in the provision of means for insuring that the resurfacing device will operate to cut the block with a slanting surface in the manner described. In the illustrative construction, the desired end is secured by mounting the guide or track, on which the carrier or slide for the resurfacing device moves, at a slight angle to the under surface of the presser arm. Preferably adjusting means is provided so that the extent of said angle may be varied as conditions may require. In clicking machines as ordinarily constructed, the guide when mounted as described will be inclined at a slight angle to the horizontal, so that the resurfacing device will gradually move downwardly as it moves rearwardly away from the front of the block.

Another object of the invention is the provision of a block leveler which requires but little power to operate, which is light and easy to apply and remove, being readily applied from one clicking machine to another, and which will serve its office in a thoroughly practical, efficacious and serviceable manner.

With the foregoing and other objects in view, which will appear as the description proceeds, the invention resides in the combination and arrangement of parts and in the details of construction, hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1:
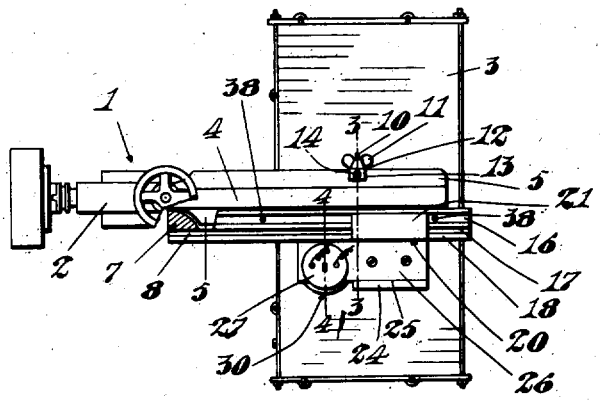
Figure 1 is a plan view of a clicking machine showing the attachment applied, a portion being broken away.
Figure 2:
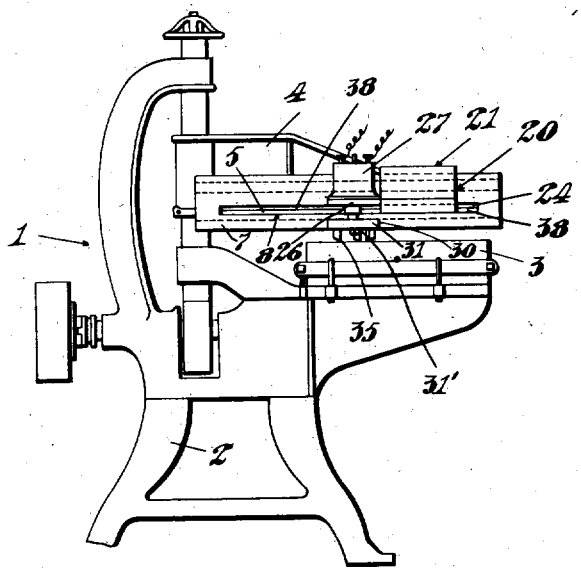
Fig. 2 is a side elevation of the clicking machine and the attachment.
Figure 3:
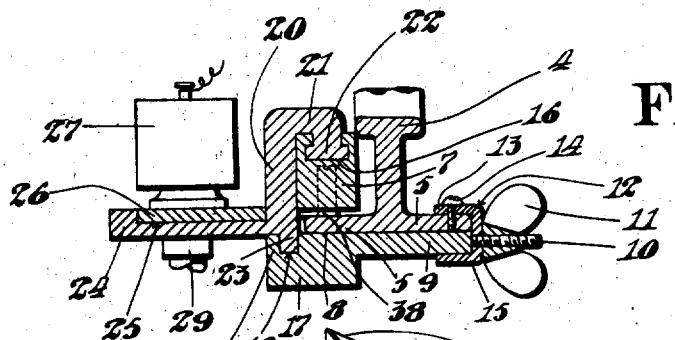
Fig. 3 is a section on the line 3—3 of Fig. 1.
Figure 5:
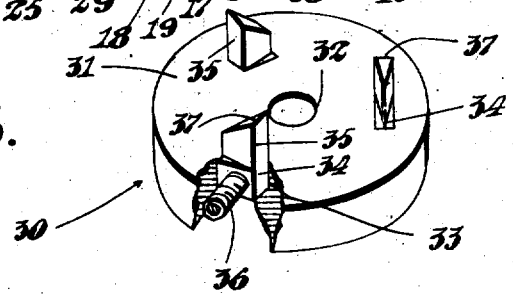
Fig. 5 is a perspective view of the cutter, a portion being broken away.

In the drawings, there is illustrated an ordinary clicking machine 1, embodying the frame or stand 2, carrying the horizontal block or bed 3 for supporting the material, and also embodying an oscillatory and vertically movable arm 4 above the block 3. The machine, which is a clicking press of a well-known type similar in many respects to the commercial form of clicking machine shown in United States Letters Patent No. 921,503, granted May 11, 1909, on an application filed by Arthur Bates, is provided with means for reciprocating the horizontally swinging arm 4 so that it will impinge with great force upon the die (not shown) positioned upon the material disposed on the block 3, to cause the die to cut the material. As illustrated, the arm 4 is provided with lower outstanding flanges or wings 5 arranged in a horizontal plane and projecting in opposite directions, which flanges are employed for the application of the present attachment to the clicking machine.

The attachment comprises a body or casting 7 adapted to be disposed at one side of the arm 4 parallel therewith, and having a longitudinal slot 8 opening at one side of the body 7 for receiving one flange or wing 5, to apply the body 7 to the arm 4. The body 7 is provided with a rigid arm 9 extending at an angle therefrom to lie underneath and extend transversely across the lower surfaces of the flanges 5. The end of the arm 9 has a reduced stem 10 upon which a wing nut 11 is threaded, and a U-shaped attaching clip 12 straddles the edge of the flange 5 remote from the body 7, the upper limb 13 of the clip 12 being secured upon said flange 5 by means of a screw 14 or other securing element, and the lower limb 15 of the clip supports the end of the arm 9. The stem 10 extends through the intermediate portion of the clip 12 and the nut 11 bears against said clip, whereby when the nut is tightened, the body 7 is drawn tightly into place to hold it firmly upon the respective flange 5 of the arm 4. Thus, by means of the clip 12 and nut 11, the arm 9 of the body 7 is connected to that flange 5 remote from the body, and the body is drawn tightly into place.

The body 7 is provided with an upper longitudinal groove 16 of T-shaped cross section, and said body is provided at that side remote from the arm 4 with a lower outstanding flange 17 provided with an upturned lip 18 forming a groove 19 between said lip and the body. A slide or carrier 20 is disposed in a vertical plane against that side of the body 7 opposite to the arm 4 and is provided at its upper edge with a portion 21 overhanging the body and provided with a tongue 22 of T-shaped section working within the groove 16. In other words, the slide has a portion projecting laterally above and hooking over a portion of the upper guide on the supporting body 7. The lower edge of the slide 20 has a tongue 23 working in the groove 19, whereby the two tongues of the slide in engaging the body will guide the slide 20 for longitudinal movement of the body 7 parallel with and at one side of the arm 4. It thus appears that the supporting body 7 is provided with two guides comprising the guideways 16 and 19, which are entirely independent of each other but which coöperate to support the slide in its movements along the presser arm 4. It will be clear that, in the illustrative construction, each guide furnishes a surface which supports the slide as well as surfaces which act to guide the slide during movement along the presser arm. The slide 20 is provided adjacent to its lower edge with an outstanding horizontal shelf 24 provided with a relatively wide groove 25 in which a supporting bar or bracket 26 is secured by means of bolts, screws, or other securing elements, the inner end of the bar 26 projecting from the shelf 24.

An electric motor 27 is secured upon the inner projecting end of the bar 26 with its armature arranged vertically and the armature shaft 28 of the motor projects downwardly through the bar 26 and has a collar 29 thereon below said bar. A cutter or planer 30 is fitted upon the lower terminal of the shaft 28 and is secured against the collar 29 by means of a nut 31′ or other retaining element engaged upon the lower end of the shaft 28 and bearing upwardly against the cutter. The cutter 30 rotates in a horizontal plane above the block 3. In order to position the cutter above the front portion of the bed, the screws or bolts which secure the bar or bracket 26 to the shelf 24 are removed and the bracket 26 turned so as to locate the cutter closely adjacent to the front end of the presser arm.

The cutter 30 embodies a horizontal disk 31 having a central aperture 32 for receiving the shaft 28, and provided with a plurality (in this case three) of rectangular apertures 33 in which the shanks 34 of the cutter bits 35 are disposed, said shanks being of rectangular cross section and fitting slidably in said apertures 33. The shanks are clamped within said apertures by means of set screws 36 threaded into the periphery of the disk 31, and when said set screws are loosened, the cutter bits can be adjusted. Said bits require a minimum amount of power to actuate them. The bits 35 project downwardly from the disk 31 to engage the upper surface of the block 3, and decrease in thickness and length from their relatively wide forward edges, to provide sharp ends for shaving the surface of the block.

Vertical adjusting screws 38 are threaded within the body 7 below the groove 16, and are accessible from above, so that they can be rotated by means of a screw driver or other suitable implement. The screws or clamping means 38 project downwardly into the slot 8 and are adapted to seat upon one flange or wing 5 of the arm 4, adjustably to support the body 7. This permits of the vertical adjustment of the body for adjusting the cutter likewise, in order that the cutter can be adjusted for shallower or deeper cuts at different portions of the block. For instance, in the illustrative construction the rear end of the supporting body 7 may be supported at a lower level than the front end through the proper adjustment of the screws 38 with or without the use of sheets of material of various thicknesses interposed between the body 7 and the lower face of the adjacent flange 5 of the presser arm and at or adjacent to the rear end of the supporting body 7.

The body 7 can be readily attached to the arm 4, as above indicated, when it is desired to surface the block 3, and the motor 27 can be connected by a cord with the lighting or power wires of the shop, whereby to operate the motor, so that the cutter 30 will be rotated. The arm 4 is then adjusted vertically in order that the cutter 30 will properly act upon and level or resurface any or all portions of the block 3. The slide 20 is adjusted by sliding it upon the guides or tracks of the supporting body 7. This is done to obtain a new or fresh line of cutting operations across the block, the cutting operations taking place during the time that the cutter is swung along with the presser arm from one end of the bed to the other. It will be understood that the cutter may be operated only when above surfaces adjacent each end of arcual path made by swinging the cutter over the bed. The reason for this mode of operation resides in the fact that the middle portion of the block may not need to be leveled or resurfaced. The cutter has a range of movement over the entire surface of the block 3, due to the swinging movement of the arm 4, and the sliding movement of the slide 20 parallel with said arm at one side thereof. The cutter rotates about a vertical axis whereby the cutter in being moved over the surface of the board and rotating simultaneously, will provide an efficient surfacing cut. The cutter requires but minimum power to operate it. Furthermore, the attachment is light in weight, and can be readily taken from one machine and applied to another, and has other obvious advantages.

Figure 6:
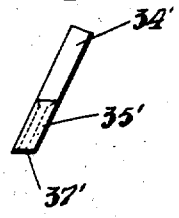
Fig. 6 is a view of a modified form of cutter bit.
Figure 4:
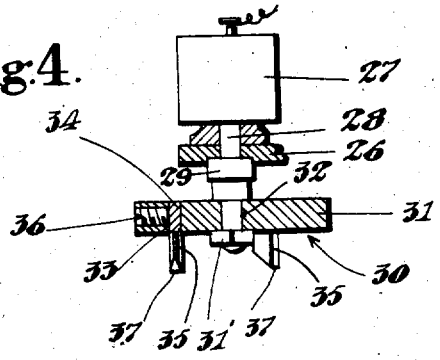
Fig. 4 is an enlarged section on the line 4—4 of Fig. 1, illustrating the motor in elevation.

In Fig. 6, a modified form of cutter bit is illustrated, the bit being designated 35′ and being arranged in an inclined or oblique position, together with its shank 34′. The chisel edge 37′ of the bit 35′ is arranged at an oblique position relative thereto to be disposed in a horizontal plane while the bit is applied to the body or disk of the cutter in an inclined position.

Having thus described the invention, what is claimed as new and desired to be secured by Letters Patent of the United States is:—

1. The combination with a machine having a block or bed and an arm movable thereover, of a detachable unitary block resurfacing apparatus comprising a planing or leveling device, an electric motor, a slide on which said motor and planing device are mounted, and means for supporting the slide for movements relatively to the arm comprising a plurality of guides having upwardly facing surfaces which directly support the slide.

2. The combination with a machine having a block and an arm movable to different positions over the block, of a motor driven device for resurfacing the block, a carrier for said device, and means for supporting the carrier for movement along the arm comprising guides spaced from each other and having a plurality of upwardly facing supporting surfaces upon which the weight of the carrier is taken.

3. The combination with a machine having a block, and an arm movable to different positions over the block, of a motor-driven device for leveling the surface of the block, a slide for carrying the device, and means for slidably supporting said slide on the arm comprising a lower guide and an upper guide, the construction and arrangement being such that the slide has a portion projecting laterally above and hooking over a portion of the upper guide on the said supporting means.

4. The combination with a machine having a block, and an arm movable to different positions over the block, of a slide movable longitudinally of the arm, a device for leveling the surface of the block and an electric motor for driving the device both carried by the slide, and means for slidably supporting said slide on the arm comprising a plurality of independent guides having surfaces which take the weight of the slide.

5. The combination with a machine having a block and an arm movable laterally over the block, of a device for resurfacing the block, and a support for mounting the resurfacing device for movemnt along the arm, said support having an inclined surface constructed and arranged to move the resurfacing device downwardly progressively with movement thereof rearwardly along the arm to cause the resurfacing device to cut lower at the rear portion of the block than at the front portion thereof.

6. The combination with a machine having a block, and an arm movable laterally over the block, of a device for resurfacing the block, a body for slidably supporting the device, and securing members for adjustably securing the body to the presser arm so that the rear portion thereof is lower than the front portion, the construction being such that as the resurfacing device slides rearwardly on its supporting body it is gradually lowered while cutting the surface of the block.

7. The combination with a machine having a block and an arm movable laterally over the block, of a device for resurfacing the block, a support for mounting the resurfacing device on the arm, and securing members for fixedly holding the support on the arm at an angle to the under surface of the arm so that as the resurfacing device is moved rearwardly on the arm it is lowered toward the block.

8. The combination with a clicking machine having a block, and a horizontally swinging arm above said block having opposite outstanding flanges, of a body disposed at one side of said arm and having a longitudinal slot receiving one of said flanges, the body having means extending under said flanges and engageable with the other flange to hold the body against the arm, clamping means carried by the body to bear against the first mentioned flange of said arm, the body having a lower longitudinal outstanding flange at that side opposite to the arm and having an upper longitudinal groove above the first mentioned flange of said arm and slot of the body, a slide bearing against said side of the arm having means at its lower edge engaging the flange of the body to hold the slide thereagainst, the upper edge of the slide having an overhanging portion engaging in said groove, the slide having an outstanding shelf, and means carried by said shelf for leveling the upper surface of said block.

9. An apparatus for resurfacing blocks used on clicking and other dieing-out machines comprising a device for cutting away portions of a block to level the surface thereof, a shiftable member for carrying said device, and a support for mounting the member for movement over the block comprising a plurality of independent guideways in the support having spaced surfaces which take the weight of the shiftable member.

10. An apparatus for resurfacing blocks used on clicking and other dieing-out machines comprising a device for resurfacing a block, a slidable member for carrying said device, and a support for mounting the member over the block comprising parts constructed and arranged to move the resurfacing device downwardly toward the block progressively with movement of the device in one direction along the support to cause the resurfacing device to cut lower at one side of the block than at the other side thereof.

11. An apparatus for resurfacing blocks used on clicking and other dieing-out machines comprising a cutter, a member for carrying the cutter, and a support for movably mounting the member over the block, said support and member having coöperating surfaces arranged to move the cutter downwardly toward the block progressively with movement of the cutter in one direction along the support to cause the cutter to cut lower at one side of the block than at the other side thereof.

12. An apparatus for resurfacing blocks used on clicking and other dieing-out machines comprising a cutter, a carrier for the cutter, and a member for supporting the carrier for movement laterally over the block and also from front to rear of the block, said carrier and member having cooperating surfaces arranged to move the cutter downwardly toward the block as it is moved from front to rear along the supporting member whereby the block is cut lower at the rear than at the front portion thereof.

In testimony whereof I have signed my name to this specification.

ALBERT CASH.